BEST AVAILABLE COPY
W. A. KIRBY.
Harvesting Machine.
No. 1,492. Reissued June 9, 1863.
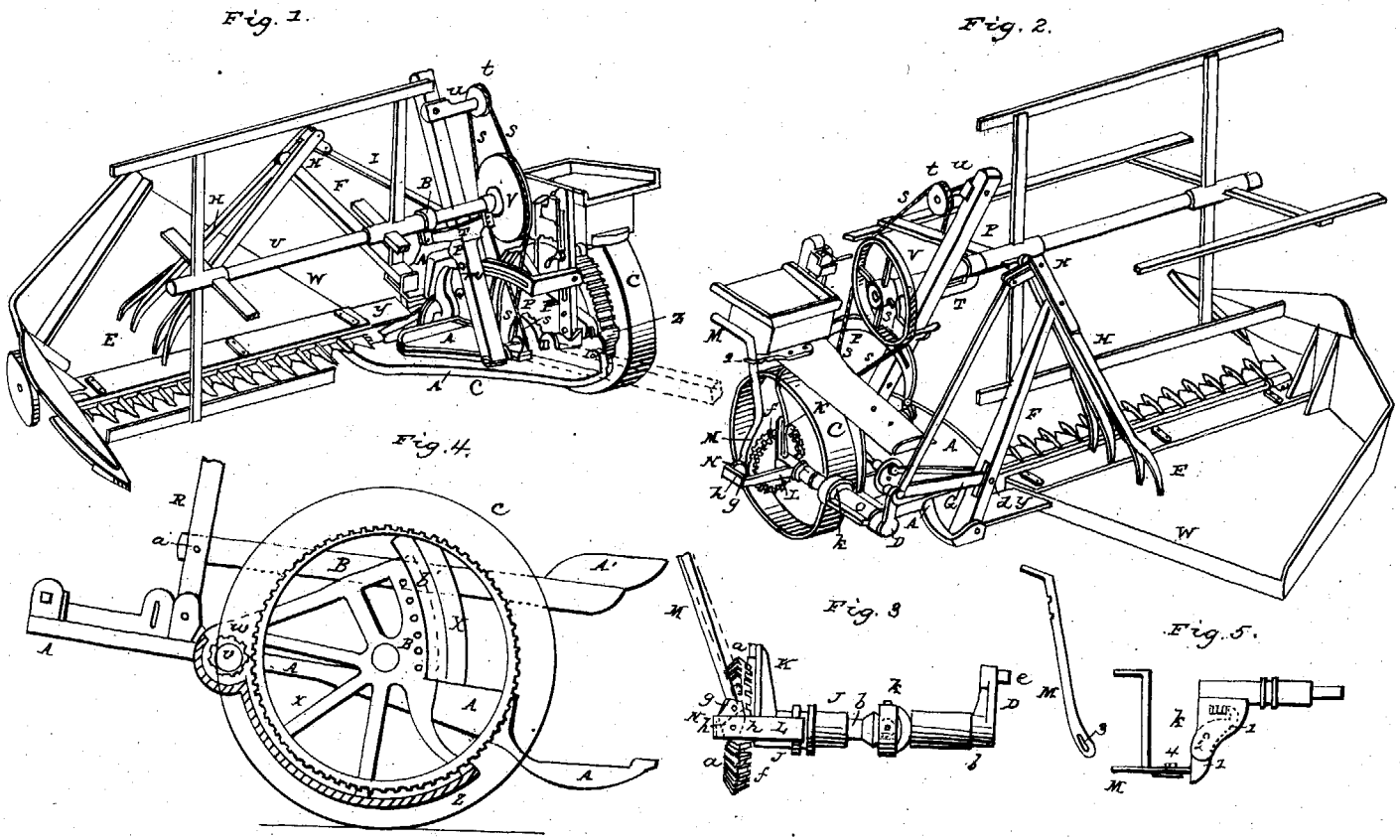
Witnesses:
C. Cohen
Salem Hirsh
Inventor:
William A. Kirby
By atty A. B. Stimpson
N. PETERS, Photo-Lithographer, Washington, D. C.

UNITED STATES PATENT OFFICE.

WILLIAM A. KIRBY, OF BUFFALO, AND DAVID M. OSBORNE, OF AUBURN, NEW YORK, ASSIGNEES OF SAID WM. A. KIRBY.

IMPROVEMENT IN HARVESTING-MACHINES.

Specification forming part of Letters Patent No. 32,736, dated July 2, 1861; Reissue No. 1,492, dated June 9, 1863.

DIVISION A.

*To all whom it may concern:*

Be it known that WILLIAM A. KIRBY, of Buffalo, in the county of Erie and State of New York, did invent certain new and useful Improvements in Harvesting-Machines and the Raking Apparatus thereof; and we do hereby declare that the following is a full, clear, and exact description thereof, reference being had to the accompanying drawings, making a part of this specification, in which—

Figure 1 represents a perspective view of the machine, taken from the front, and looking obliquely toward the main frame and driving-gear. Fig. 2 represents a perspective view of the machine, taken from the rear of the main frame, and looking toward the outside divider. Fig. 3 represents a portion of the rake-gearing detached, and on an enlarged scale to better show its action. Fig. 4 represents a side view of the main frame and main drive-wheel, to show the manner of arranging the shield on the frame to protect the gearing that runs close to the ground. Fig. 5 represents a modification of the device for throwing the rake in and out of gear with the driving-gear of the machine.

Similar letters of reference, where they occur in the several figures, denote like parts of the apparatus in all the drawings.

This part of the invention of the said KIRBY consists, first, in combining with an automatic rake in a reaping-machine a hinged reaching-post and two connecting-rods operated from one and the same crank for the purpose of giving said rake its proper motions; and it further consists in hinging and supporting the rake-post on the main frame and inclining it backward, so that the rake will be out of the way of the falling grain when at rest, and be raised high enough as it moves toward the outside divider to avoid the falling grain and drop beyond the stalks on the platform preparatory to sweeping them off; and, finally, it consists in combining with an automatic rake a lever, trigger, and clutch-arm, so that the driver at his seat may stop or set the rake in motion at his will, or set the trigger so that it will stop the rake after making one operation.

To enable others skilled in the art to make and use this part of the said KIRBY'S invention, we will proceed to describe the same with reference to the drawings.

A represents a main frame, to which the finger-bar, cutting apparatus, platform, reel, and a portion of the driving-gear are connected; and B is a supplemental or segmental frame pivoted to the main frame A, this frame B having the main driving and supporting wheel C, as well as the driver's seat, connected with it, and also some of the gearing. These things are shown, described, and some of them claimed in patents heretofore granted to said KIRBY, and need not be referred to in detail in this specification.

There is attached to the main drive-wheel C a bevel-pinion that turns with the drive-wheel. This pinion gears and turns a bevel-gear, *a*, on one end of a shaft, *b*, the other end of said shaft having a crank, D, upon it for operating the rake E, as follows: A rake-post, F, is hinged at *c* to a projecting portion of the main frame A, the hinge-joint being so arranged as that said rake-post may swing toward or from the grain side of the platform, but not in the line of the motion of the machine. A connecting rod or bar, G, is pivoted to the rake-post F at the point *d*, and its other end is pivoted to a wrist-pin, *e*, of the crank D, so that this crank and connecting-rod define the swinging motion of the said rake-post—that is to say, the extent of its motion. To the top of the rake-post is pivoted the shank or handle H of the rake or fork E, this shank extending beyond its pivoted point, and at or near its end having a pitman, I, connected with it, which pitman also extends to and is connected with the wrist-pin *e* of the crank D, so that the crank D gives a compound motion to the rake by swinging the rake-post toward and from the outside divider or fence by means of the pitman G, and causing it to rise and fall, and then be drawn back over the platform mainly by the pitman I, but partially by the pitman G. The fork in going toward the outside divider first rises and advances in a curved line, and then descends to the outer side of the platform; but in returning it sweeps the stalks off from the platform, leaving them in a compact gavel on the ground. If the rake were allowed a continuous motion, the gavels gathered by it would be of different sizes and in bad condition to be bound, and hence I have arranged so that the rake shall be thrown out of motion at every revolution of its gear-wheel, and be held out of motion, at the will of the driver or conductor, until sufficient grain has accumulated on the platform to make a proper-sized gavel, when it is thrown into action again and sweeps the platform. This is done as follows: On the back of the bevel-gear *a* there are a series of teeth or notches, *f*, and upon the shaft *b* there is a sleeve or boss, J, which has an arm, K, upon it, and this boss and arm are thrown up toward the teeth of the wheel *a* by a spring, L. The boss has grooves cut in it, which slip over or upon feathers on the shaft *b*, and when the arm K is in one of the notches *f* the shaft *b* is set in motion and operates the rake; but when the arm K is thrown out of its notch, or any of them, it moves the boss back and uncouples the gear *a* from the shaft *b*, and then the rake instantly stops, although the gear *a* continues to run with the main drive-wheel.

To throw out the arm K, a lever, M, is used, which extends from near the driver's seat to a point near the perimeter of the gear *a*, where it is hinged, as at *g*, to a toggle-trigger, *h*, that is pivoted at *i* to the supporting-piece N, so that when the lever M is in the position shown in Fig. 1 and in black in Fig. 4 the rake will continue to run; but when the lever M is dropped, as shown in red in Fig. 3, the trigger *h* is thrown out, and when the arm K comes around to it it (the arm) will come in contact with the trigger and be forced out of its tooth in the wheel and rest upon the trigger, instantly stopping the rake-shaft, crank, and rake itself. When enough stalks have accumulated on the platform to make a gavel the driver again draws up the lever M, and the arm K, being released, is thrown into one of the notches *f* by the spring L and the rake is again in motion. There is a guide-arm, *j*, near the upper end of the lever M, and two notches, 1 2, in the lever itself. If the lever be secured to the guide *j* by its notch 1, the rake will be thrown out of action, and remain out so long as this notch or connection be used; but if the lever be secured by its notch 2 to the guide *j* the rake will be in action, and so remain in action as long as this connection is maintained. Thus the driver can control the motion of the rake at his will, either keeping it in or out of action constantly, or periodically, as circumstances may require.

It is stated that the rake-post was connected to the main frame, but driven from the main wheel, which is on the supplemental frame, and the main frame is raised and lowered, and sometimes left free to raise and lower itself in conforming to the inequalities in the surface of the ground, or in fixing the height at which the cutters are to work. This being the case, provision must be made to allow the fork or rake to follow the platform as it is raised or lowered, without cramping the gear, which is not correspondingly raised or lowered. This is accomplished by means of a universal joint, *k*, in the rake-shaft *b*, which allows the two frames all their requisite play or adjustment, and leaves the rake free to accommodate itself to the platform at any of its positions.

O is a reel-post, bolted to the main frame at *l*, so that it may, when it becomes necessary to swing the reel farther into, toward, or from the standing grain, be moved on this bolt or fastening. A guide and supporting-piece, P, is connected to the main frame, or to the uprights Q R on the main frame, and has a curved slot, *m*, in it, so that by means of a nut and bolt, *n*, the reel-post may be adjusted and supported by this guide-piece. This makes the reel-post rigid and firm when adjusted, and the nuts are run up onto the bolts. Upon the reel-post is fixed or placed a buckle or slide, S, which, for convenience, is clamped to the post at any proper height by a cam-lever, *o*, which makes the slide easy of adjustment on the reel-post. A yoke, *t*, is formed or connected to this slide, and has two bearings, *p p*, one upon each of its ends, in which the reel-shaft U is supported and turns, and thus the use of an outside reel-post is avoided. The reel-shaft and the reel are driven from a pulley, *q*, by means of an endless belt, *s*, passing around it and around a loose pulley, *t*, on an arm, *u*, near the top of the reel-post, and said arm and pulley may be adjustable thereon to strain up or slacken the belt when necessary. The pulley V on the end of the reel-shaft being much larger than the pulleys *q t*, the belt *s* pinches into the groove of the reel-shaft pulley V with sufficient friction to drive the reel, while the reel may be raised or lowered without any adjustment of the belt or any disarrangement of it. Nor will the tension of the belt *s* be changed by turning the reel-post on its bolt *l*, as said bolt is in the plane of the center of the pulley *q*.

The rake or fork E traverses parallel to and just behind the finger-bar, so that it comes against the butt-ends of the straws and sweeps them toward the gaveling-space at the main-frame side of the platform, and this side, W, is made oblique, so that the heads of the stalks which lie toward the rear of the platform will arrive at the edge thereof while the butt-ends are still on the receiver or platform *y*, and the moment the heads come in contact with the stubble, the machine advancing, the gavel is drawn off onto the ground in good shape for binding, or, rather, the stubble holding onto the heads of the grain, the machine passes out from under the gavel, and hence there is no dribbling of the straws, as is the case when the gavel is thrown off by mechanism that is advancing with the machine and continues to deliver the straw as it advances.

The supplemental frame B, that carries the drive-wheel C, is pivoted or hinged to the main frame at a point, *v*, which point is also the center of the pinion *w*, that is driven by the main drive-wheel, so that the latter, as it rises and falls, rolls around the pinion and always keeps in gear with it. The rear of the supplemental frame is in the form of an arc of a circle, and moves in or against an arc, X, on the main frame, so that by means of a pin the two frames may be held or their motion controlled; or by the removal of the pin they may move independently of each other, as either may happen to be influenced by the ground over which they or any of their connected parts may for the time being be moving.

The cogged gear Y on the drive-wheel C runs close to the ground, and is liable to be injured by stones or other obstructions, or to become clogged with dirt, straws, grass, &c. So, also, the pinion *w* is liable to damage, and particularly to the catching and winding up of straws, grass, &c. To prevent these difficulties and annoyances a guard or shield is devised to protect them. This guard or shield could not be on the main frame, because the drive-wheel rises and falls independent of said main frame; or said main frame must be raised or lowered sometimes on the auxiliary frame to regulate the height of the cutters, and one would interfere with or fail to be a protection to the other. The shield Z is cast or permanently attached to the supplemental frame by means of arms *x*. It curves around in close proximity to the periphery of the cog-gear Y, and thus protects it from injury or from clogging. The shield is also extended around the pinion *w* to protect it also. This can be done, notwithstanding this pinion is on the main frame, because the center of motion of the supplemental frame to which the shield is attached and the center of motion of the pinion are one and the same, and hence the curved shield around the pinion will always maintain a fixed position in relation to said pinion, however much the two frames may play or be moved one upon the other, their center of motion being also at *v*, which is the center of motion of the shield also.

There are several other parts of the machine which are not specially described; but they are shown in the drawings, and it is not deemed important to describe them here, as they are described, and some of them claimed, in other patents granted to the said KIRBY or his assignees.

By using an overhanging reel, as herein shown, we dispense with the use of any reel-supporter on the outside of the machine, such outer reel-supporters being liable to entangle or get entangled in the grain, and thus obstruct the free passage of the machine.

When the machine is to be used without the rake attachment a raker's seat, A′, may be attached to the machine, as represented in Fig. 4, the front end of the seat-supporter being secured to the standard R by means of the bolt *a′*, said supporter resting also on the frame of the machine, as at *b*.

In Fig. 5 is represented a modification of the devices for throwing the rake in and out of gear with the machine. A spring-lever, 1, is pivoted at 2 to the crank K. The end of this spring-lever is pressed in between the cogs *f* of the bevel-wheel *a*, and is disengaged from said bevel-wheel by means of the lever M, the lower end of which is provided with a cam-slot, 3, through which the bolt 4 passes. By this arrangement the piece *h*, as shown in Fig. 3, may be dispensed with.

Having thus fully described this part of the invention, what is claimed therein as the invention of WILLIAM A. KIRBY is—

1. In combination with an automatic rake in a reaping-machine, a hinged reaching-post and two connecting-rods operated from one and the same crank for the purpose of giving said rake its motions, substantially as described.

2. Hinging and supporting the rake-post on the main frame and inclining it backward, so that the rake will be out of the way of the falling grain when at rest and be raised high enough as it moves toward the outside divider to avoid the falling grain and drop beyond the stalks on the platform preparatory to sweeping them off, substantially as described.

3. In combination with an automatic rake, the lever, trigger, and clutch-arm, substantially as described, so that the driver at his seat may stop or set the rake in motion at his will, or set the trigger so that it will stop the rake after making one operation, as described.

WM. A. KIRBY.
D. M. OSBORNE.

Witnesses:
JOHN H. OSBORNE,
CHAS. H. GARLOCK.